United States Patent
Kalaei et al.

(10) Patent No.: US 12,066,012 B2
(45) Date of Patent: Aug. 20, 2024

(54) HEAT HARVESTING OF END-OF-LIFE WELLS

(71) Applicant: CONOCOPHILLIPS COMPANY, Houston, TX (US)

(72) Inventors: Mohammad H. Kalaei, Houston, TX (US); Benjamin Lascaud, Houston, TX (US); Thomas J. Wheeler, Houston, TX (US); Gustavo A. Gomez, Houston, TX (US); Julian Ortiz Arango, Houston, TX (US); Harish T. Kumar, Houston, TX (US)

(73) Assignee: CONOCOPHILLIPS COMPANY, Houston, TX (US)

(*) Notice: Subject to any disclaimer, the term of this patent is extended or adjusted under 35 U.S.C. 154(b) by 0 days.

(21) Appl. No.: 18/452,722

(22) Filed: Aug. 21, 2023

(65) Prior Publication Data
US 2024/0068450 A1    Feb. 29, 2024

Related U.S. Application Data

(60) Provisional application No. 63/374,230, filed on Aug. 31, 2022.

(51) Int. Cl.
*F24T 10/20* (2018.01)
*E21B 43/24* (2006.01)
*F03G 4/00* (2006.01)

(52) U.S. Cl.
CPC .......... *F03G 4/063* (2021.08); *E21B 43/2406* (2013.01)

(58) Field of Classification Search
CPC .... E21B 43/129; E21B 41/00; F24T 2010/56; F24T 10/15; F24T 10/30; F24T 2010/53; F28F 2250/08; Y02E 10/10; F28D 1/05316
See application file for complete search history.

(56) References Cited

U.S. PATENT DOCUMENTS

| 3,786,858 | A |   | 1/1974 | Potter |
| 3,827,243 | A | * | 8/1974 | Paull ................ E21B 43/16 166/272.6 |
| 7,717,173 | B2 |  | 5/2010 | Grott |

(Continued)

FOREIGN PATENT DOCUMENTS

WO    2021231533 A1    11/2021

OTHER PUBLICATIONS

The future of geothermal energy: Impact of enhanced geothermal systems (EGS) on the US in the 21st century. MIT Report (2006).
(Continued)

*Primary Examiner* — Shafiq Mian
(74) *Attorney, Agent, or Firm* — Boulware & Valoir PLLC

(57) ABSTRACT

The present disclosure generally relates to harvesting geothermal energy from mature and near end-of-life oil and gas reservoirs that have been subjected to secondary oil recovery steam processes like steam-assisted gravity drainage (SAGD), steamflood, etc. The geothermal potential of these mature SAGD reservoirs can be used to generate green electricity thus reducing the greenhouse gas (GHG) footprint of the oil production. Lateral spacing of injectors and producers, with closing of unused members of a well-pair for energy recovery is described.

9 Claims, 8 Drawing Sheets

(56) References Cited

U.S. PATENT DOCUMENTS

| | | | |
|---|---|---|---|
| 7,814,975 B2* | 10/2010 | Hagen | E21B 43/24 |
| | | | 166/266 |
| 8,382,886 B2 | 2/2013 | Kelly | |
| 9,909,782 B2 | 3/2018 | Lakic | |
| 11,598,186 B2 | 3/2023 | Randolph | |
| 2009/0071648 A1* | 3/2009 | Hagen | E21B 43/24 |
| | | | 166/272.1 |
| 2010/0272515 A1 | 10/2010 | Curlett | |
| 2013/0300127 A1* | 11/2013 | DiNicolantonio | F03G 7/04 |
| | | | 290/1 R |
| 2020/0101922 A1* | 4/2020 | Wunderlich | B23K 20/12 |
| 2021/0025265 A1* | 1/2021 | Randolph | F24T 10/20 |
| 2022/0034258 A1 | 2/2022 | Aikman | |

OTHER PUBLICATIONS

International Search Report for PCT/US23/72553 dated Feb. 22, 2024.

\* cited by examiner

HEAT HARVESTING OF END-OF-LIFE WELLS

PRIOR RELATED APPLICATIONS

This application claims priority to U.S. Ser. No. 62/374,230, filed Aug. 31, 2022, and incorporated by reference in its entirety for all purposes.

FEDERALLY SPONSORED RESEARCH STATEMENT

Not applicable.

FIELD OF THE DISCLOSURE

The present disclosure generally relates to harvesting geothermal energy from mature and near end-of-life oil and gas reservoirs that have been subjected to secondary oil recovery steam processes like steam-assisted gravity drainage (SAGD), cyclic steam stimulation (CSS), steam flooding, etc. The geothermal potential of these mature reservoirs can be used to generate green electricity, thus reducing the greenhouse gas (GHG) footprint of oil production.

BACKGROUND OF THE DISCLOSURE

With late life oil and gas reservoir operations, secondary oil recovery processes have become important tools to recover oil from maturing oil wells. Many heat assisted oil recovery processes are known, but the most common and widely used steam based oil recovery methods are steam flooding or steam drive (SD), cyclic steam stimulation (CSS), and steam assisted gravity drainage (SAGD).

Steam Drive (SD): In steam flooding or steam drive (SD), steam is pumped into one well to heat and drive the oil to an adjacent well. This method can be performed with vertical or horizontal wells.

Cyclic steam stimulation (CSS): Commonly used in Canadian oil sand reserves, cyclic steam stimulation (CSS) uses steam injection into a well at very high temperatures of 300-240° C. for a certain of time. The well is allowed to sit for days to weeks to allow the heat from the steam to be transferred to the formation thereby heating the oil. The hot oil is then pumped out of the well. When the production rate starts to drop, another round of steam injection, followed by soak and then pump cycle is repeated. Thus, this method derives its name of cyclic steam stimulation, or "huff-and-puff".

SAGD: Steam assisted gravity drainage (SAGD) is a technology for producing heavy crude oil and bitumen involving an advanced form of steam stimulation. Like CSS, SAGD is also extensively used in Canada in oil sand regions to extract bitumen from reservoirs. SAGD is common in McMurray oil sands formation and have been operating for a number of years.

In traditional SAGD operations, a pair of parallel horizontal wells, one 4-5 meters over the other are used, although there are many variations on this theme. High-pressure steam is continuously injected into both wells (which are both fitted for injection) during a "start-up" phase that lasts 3-6 months. Once the two wells are in fluid communication, the lower well is converted to production use, and steam is only injected into the upper injection well. The steam heats the heavy oil or oil sands, thereby reducing oil viscosity, and the more fluid oil then gravity drains to the lower production well for production.

With the demand for increasing energy around the world, there is also an increased demand to use renewable energy systems. Research on renewable energy sources like wind, solar and geothermal energy capture and utilization has increased in the recent years. Geothermal energy is energy converted from heat underground. Geothermal heat can be harnessed for producing clean energy and is the technology being further developed herein.

Enhanced geothermal systems (EGS) have developed where geothermal energy is harvested by drilling deep wells and then injecting water down into the hot rocks. The temperature of water is kept such that the lower hot rocks fracture and become permeable. Water injection into the permeable wells subsequently heats up the water to become steam which can be pumped out via a second well. The heated water/steam is then used to generate electricity. (Ref: MIT Report, 2006: The future of geothermal energy). However, this method can be very expensive as the initial cost of drilling wells deep enough to reach the hot depths of the earth can be hard to recover from the future cost of energy generation.

Oil and gas fields already have many wells drilled therein, and in heavy oil reservoirs, considerable heat has also been added to the reservoir as oil viscosity is reduced enough for production. Thus, depleted wells could theoretically be used at the end of the production cycle, to produce clean energy instead of oil, before plug and abandonment operations.

U.S. Pat. No. 3,827,243, entitled "Method for recovering geothermal energy" is one of the first patents to apply geothermal energy harvesting technique to dry oil wells. In that patent, a heat transfer fluid is injected into an injection well, and the heated fluid harvested from the production well. US20130300127 similarly proposes harvesting geothermal energy recovery from abandoned oil wells. However, there is no proposal in either for use earlier than plug and abandonment, nor after heat stimulations.

Some research has also been carried out for recovering geothermal energy from reservoirs by injecting non water-based fluids, such as $CO_2$ (US20210025265). In this method, presence of a native fluid like oil or methane ($CH_4$) present in the reservoir, enhances the heat exchange, and is preferable to have combustible carbon sources for further heating the reservoir. Although providing at least an initial effort to use heat from reservoirs to capture energy, no effort was made to determine optimal well arrangements for capturing energy. Furthermore, means of capturing $CO_2$ for injection uses must also be provided, and it is unclear therefore, if the energy output exceeds input in this method.

Thus, what is needed in the art is a method that can harness the potential of the mature oil and gas and bitumen reservoirs that have been stimulated with steam or other heat source to produce power. The ideal method would capture more energy than expended and thereby provide green power generation.

Such an invention would allow the local use of the green power to assist in further development of the same reservoir, providing a positive loop in oil generation and simultaneously reducing the overall emissions associated with hydrocarbon production. This disclosure meets one or more of these needs.

SUMMARY OF THE DISCLOSURE

In a typical SD, CSS or SAGD operations, large volumes of steam are injected into the ground via injection wells, sometimes for decades. Those operations that are near their end-of-life and due for wind-up and/or well closure could be a potential geothermal resource before well plugging and abandonment. Thus, heat enhanced reservoirs, which have traditionally been used to produce oil, can also be used to produce geothermal power.

Generating geothermal energy from a SD, CSS or SAGD well involves injecting cool water (or other heat transfer fluid) into the well and reservoir, which becomes heated by the heat already introduced in the reservoir. This geologically heated water is then pumped back to the surface via the production well and can be then sent to a thermal plant for energy capture and production of geothermal power. However, the ideal well arrangement for such a system was previously unknown.

Described herein is a system of harvesting geothermal power from steam-assisted enhanced oil-recovery processes or other heat-based processes for producing oil, such as in situ combustion, RF heating, electrical heating, and the like. Although we focus herein on SAGD well-pairs, the method can be used in a variety of steam-enhanced reservoirs, and also in reservoirs that were electrically heated, RF heated, heated via in situ combustion, and various combinations thereof.

A SAGD-based geothermal power generation system consists of a reservoir with one or more SAGD well-pairs, each with two parallel horizontal wells—one for fluid injection and one for production. An injection line is used to inject water (or other heat transfer fluid) into the injection well and a production line in the production well is connected to a pump to recover hot produced fluid from the production well. The wells in the system are already in communication with each other such that injection line of one can be opened, and production line of an optimal production well can be opened to recover produced fluid. All of the production lines in the system are connected to a generator on-site where geothermal power from the heated steam is converted into electricity.

In one example, the electricity generated from geothermal energy produced from end-of-life SAGD can be used to power other early-life SAGD well pads in the region, either by using the electricity to generate steam or using the electricity for RF or electric heating. The electricity may also be used for any other oil & gas use. The system described can also have a power grid near the reservoir for distribution into a local, state or national electricity grid, or the geothermal energy generated can be sent to storage.

A method of harnessing geothermal energy from end-of-life wells is also described herein, where a water is injected into an injection well. This water seeps into the pores of the geological formation, which is hot, either naturally or preferably due to continuous steam injection or other heating mechanism over years, thereby heating up the injected water. The injected water can reach temperatures up to 300-360° C. downhole. This heated steam and/or water is then pumped back to the surface via production line and transferred to a generator to generate electricity using the geothermal energy.

Any type of power plant may be used to harness the heat energy from reservoir heated fluids. In one type of power plant, steam is produced from the production well and used to drive a turbine to generate electricity. In another, the heated fluid is flashed to steam in a flash tank, which then drives the turbine to make electricity. A third alternative operates at a lower geothermal water temperature of 107-182° C. and uses a working fluid with a low boiling point in the heat exchanger. The heated reservoir fluid heats the working fluid in the heat exchanger, which then drives the turbine. This indirect method may be more successful at producing electricity at lower temperature resources i.e., as low as 74° C. geothermal fluid. However, most end-of-life steam-enhanced wells are much hotter than this.

The ideal well arrangements for this end-of-life heat harvesting approach consist of arrays of wells, wherein each injector is 50-500 meters away from an adjacent injector. Alternate producers may be used, especially after the first year of energy production, but in the first year it is beneficial to use all producers and alternate injectors. Injecting water into a plurality of injectors and collecting from a plurality of laterally spaced producers seems to be the most economical method, providing that all unused wells are shut-in, and ensuring that reservoir pressure is maintained.

The present methods to harness geothermal energy include any of the following embodiments in any one or more combinations(s) thereof:

A method of producing geothermal energy from an oil and gas reservoir, said method comprising:
   a) producing oil from a plurality of horizontal well-pairs in a reservoir using added heat until oil recovery is limited, each well-pair comprising an upper well parallel to and over a lower well and said reservoir at a first pressure;
   b) selecting upper wells in alternate well-pairs to be injection wells fitted for injection and closing upper wells therebetween;
   c) selecting one or more adjacent lower wells to be production wells fitted for production, and closing unselected lower wells, such that an injection well is laterally separated from a nearest production well by a distance D;
   d) injecting fluid into said injection wells at a rate to maintain said first pressure and producing heated fluid from said production wells; and
   e) sending said heated fluid to an energy recovery system to convert geothermal energy in said heated fluid into electricity.

A method of producing geothermal energy from an oil and gas reservoir, said method comprising:
   a) producing oil from a plurality of horizontal well-pairs in a reservoir using added heat until oil recovery is limited, each well-pair comprising an injection well parallel to and over a production well and said reservoir at a first pressure;
   b) closing alternate injection wells and injecting fluid into open injection wells at a rate to maintain said first pressure;
   c) producing heated fluid from all production wells for a first period of time;
   d) closing alternate production wells such that each closed injection well is paired with an open production well and producing heated fluid from said open production wells for a second period of time;
   e) sending said heated fluid to an energy recovery system to convert geothermal energy in said heated fluid into electricity; and
   f) storing or using said electricity to produce more oil.

-continued

A geothermal energy production system comprising:
  a) a plurality of end-of-life wells in a reservoir that have been previously heat-stimulated for hydrocarbon production;
  b) at least one end-of-life injection well fitted for injection of fluid;
  c) at least one end-of-life production well being fitted for production of hot fluid and laterally spaced from a nearest end-of-life injection well fitted for injection of fluid by a distance D;
  d) a remainder of end-of-life wells being closed;
  e) said at least one end-of-life production well being fluidly coupled to an energy recovery system to convert geothermal energy from said hot fluid to electricity; and
  f) means for carrying or storing said electricity.

Any method or system herein described, wherein said fluid is water and said heated fluid is water and/or steam.

Any method or system herein described, wherein said distance D is from 50 to 2000 meters, or 100 to 500 meters, or 150 to 300 meters. Distances of 50-100 or 50-150 or 50-200 may also be suitable.

Any method or system herein described, wherein said distance D increases with time by closing additional wells.

Any method or system herein described, where said method is preceded by a first period of time wherein fluid is injected into a plurality of injector wells in alternate well-pairs and producing heated fluid from all producer wells in all well-pairs.

Any method or system herein described, wherein said electricity is electrically connected to a subsurface heat generating system and used to generate electric heat for additional wells in said reservoir.

Any method or system herein described, wherein said first period of time is about a year.

Any method or system herein described, wherein said second period of time is at least 10 years.

Any method or system herein described, wherein said plurality of end-of-life wells are arranged in well-pairs, each well-pair having a horizontal injection well parallel to and over a horizontal production well, and wherein each alternate injection well is fitted for injection and each injection well therebetween is closed and each closed injection well is paired with an end-of-life production well fitted for production.

Any method or system herein described, wherein said plurality of end-of-life injection and production wells are arranged in an array of well-pairs, and injection wells fitted for injection alternate with production wells fitted for production in adjacent well-pairs in said array.

Any method or system herein described, wherein said plurality of end-of-life wells are vertical wells.

Any method or system herein described, wherein said energy recovery system is electrically connected to a steam production system for generating steam or to oil wells to heat an adjacent portion of said reservoir or a grid for distributing electricity.

As used herein, an "end-of-life well" or a well where oil production is "limited" is a well that is otherwise ready for P&A absent a geothermal harvest as described herein. Typically, the amount of oil being produced is too little to be economical, and thus, production is shut down. The point at which an oil well becomes economical to run varies based on the price of oil, as well as on the current cost of production, but typically for steam based methods an SOR>3 or >3.5 or >4 or >5 is a good stopping point. The skilled operator is able to make such determinations based on current price per barrel and current operating expenses (e.g., end of life is when the cost of production exceeds the value of the oil or other hydrocarbon produced).

As used herein, an injector well is fitted for injection of steam, NCG or other fluid.

As used herein, a production well is fitted for production of steam, water, NCG or other fluid.

As used herein, "cold" or "cool" water (or other heat transfer fluid) is any water cooler than the reservoir, such that the heat can be captured and used. However, ideally the temperature of the injected water will be as high as possible to improve efficiency.

The use of the word "a" or "an" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim. The phrase "consisting of" is closed, and excludes all additional elements. The phrase "consisting essentially of" excludes additional material elements, but allows the inclusions of non-material elements that do not substantially change the nature of the invention, such as instructions for use, buffers, and the like. Any claim or claim element introduced with the open transition term "comprising," may also be narrowed to use the phrases "consisting essentially of" or "consisting of," and vice versa. However, the entirety of claim language is not repeated verbatim in the interest of brevity herein.

The following abbreviations are used herein:

| ABBREVIATION | TERM |
| --- | --- |
| bbl | Barrel |
| BHP | Bottom hole pressure |
| CSS | Cyclic steam stimulation |
| EGS | Enhanced geothermal systems |
| EOR | Enhanced oil recovery |
| ESP | Electrical submersible pump |
| FCD | Flow control devices |
| GHG | Greenhouse gas |
| IEPIP | Initial energy put in place |
| NCG | Noncondensable gas |
| OOIP | Original oil in place |
| P&A | Plug and abandonment |
| RF | Radio frequency |
| SAGD | Steam assisted gravity drainage |
| SD | Steam drive |
| SOR | Steam to oil ratio |

DETAILED DESCRIPTION

Figure 1A:
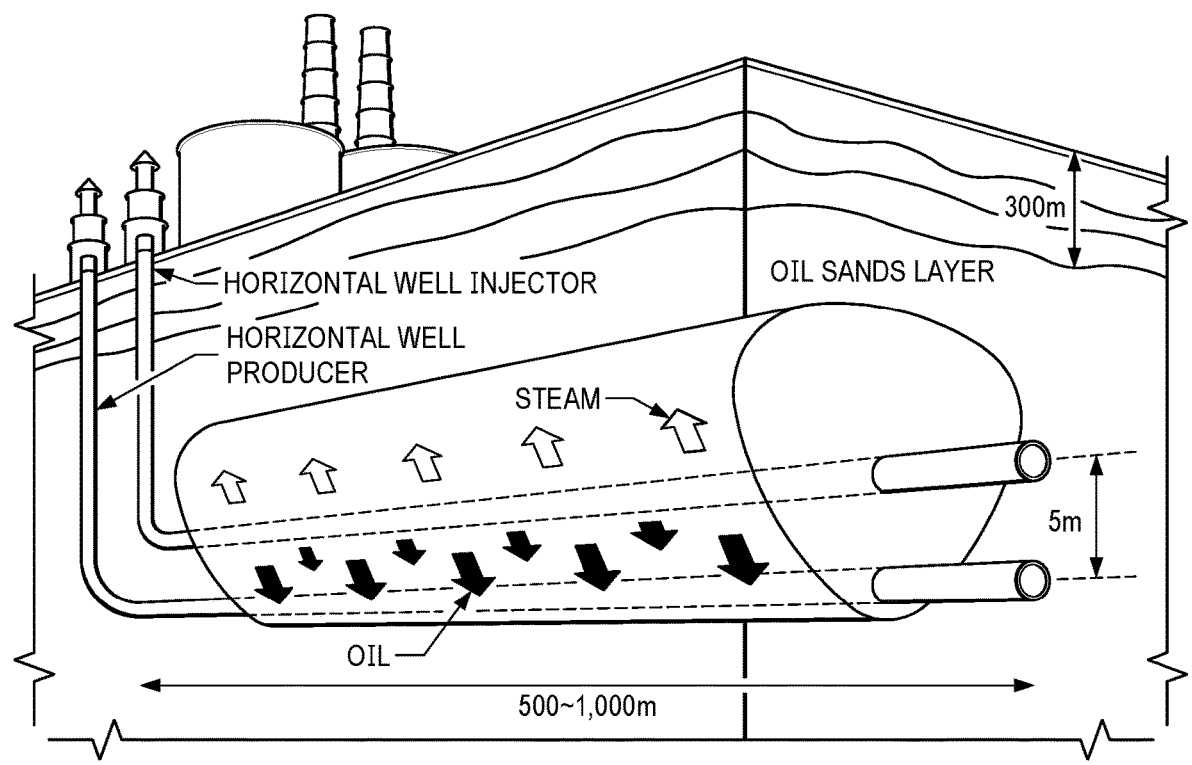
FIG. 1A (Prior art) Typical horizontal, parallel well-pair and steam chamber used for SAGD.

FIG. 1A. shows a typical horizontal, parallel well-pair and steam chamber used for SAGD, as well as for many other gravity-based variants of SAGD. As can be seen, the steam chamber is teardrop shaped, and thus an area between two well-pairs may contain stranded oil that is unable to reach the producer wells low in the pay.

Figure 1B:
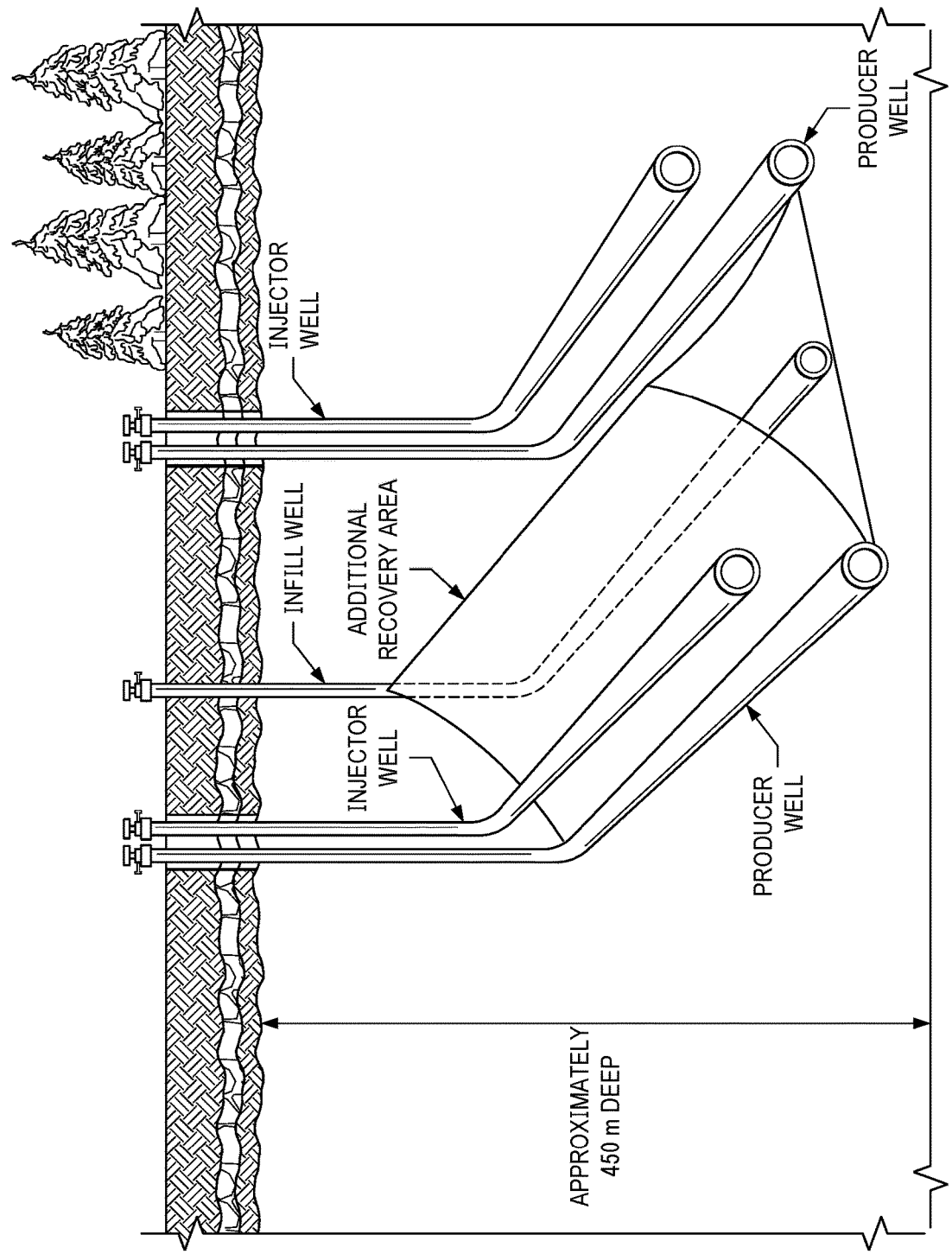
FIG. 1B (Prior art) Two SAGD well pairs with an infill well therebetween.

FIG. 1B shows an infill well between two SAGD well-pairs, which could theoretically function as an injector or producer, but herein the infill well is low in the pay and is fitted for production to capture the stranded oil between well-pairs.

Figure 1C:
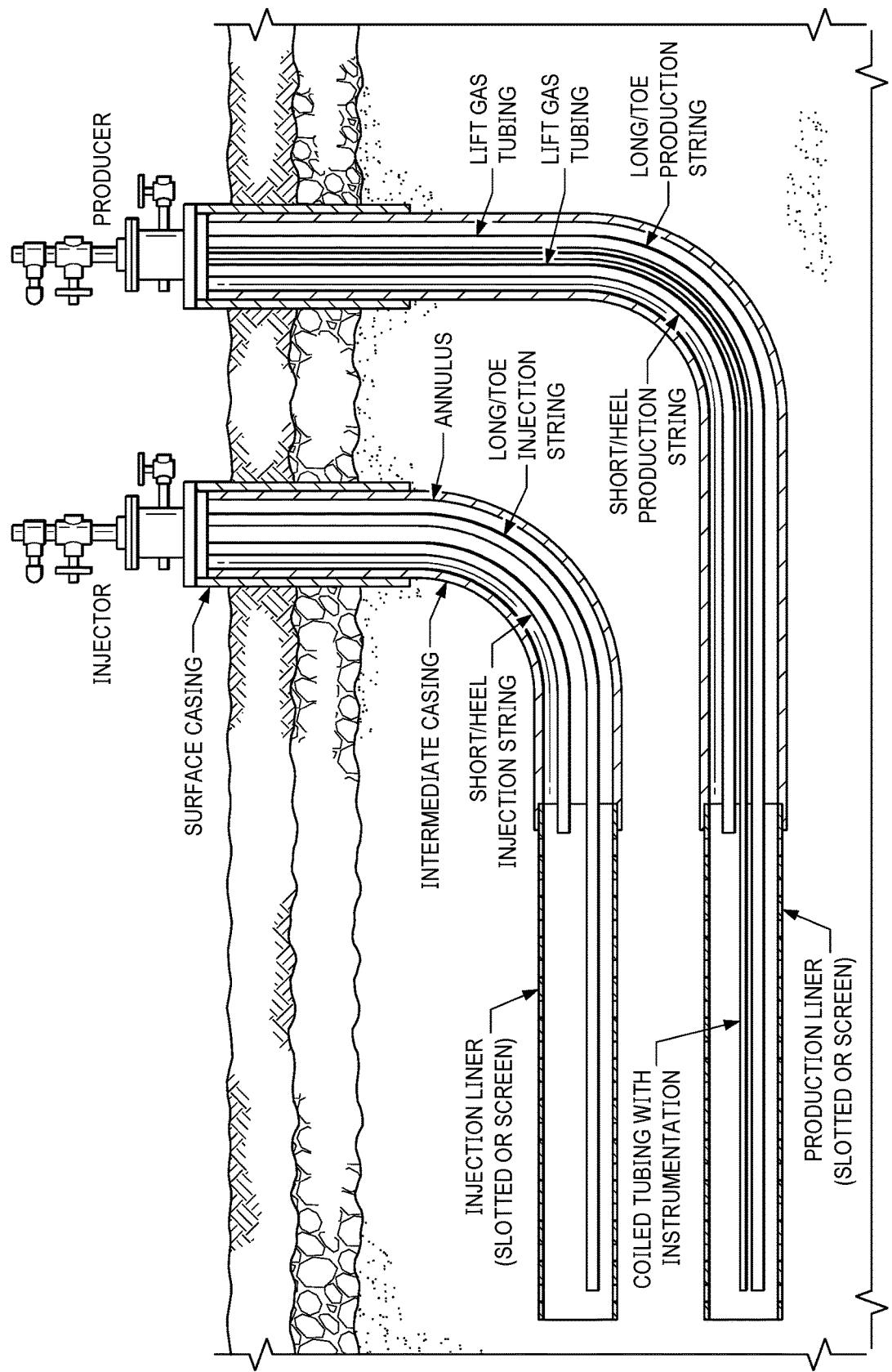
FIG. 1C (Prior art) Typical SAGD completion details.

FIG. 1C details some of the completion details of a SAGD well-pair, wherein the injector well is finished with a slotted liner or screen which lets steam out and keeps most sand and debris from entering. This well is fitted with two injection lines to delivery steam to the toe and to the heel. Other variations are of course possible, including the use of passive or active flow control devices (FCD), sliding sleeves, and the like.

Likewise, the production liner on the production well allows oil to enter, but prevents larger sand and rocks from entering, and shown are two production lines at the heel and toe, and a coiled tubing containing various instrumentation and/or control lines. Not shown is any artificial lift, but typically an electrical submersible pump (ESP) is used once gas lift and/or natural drive are diminished.

At a certain stage of the SAGD operation, as instantaneous steam-to-oil ratio or "SOR" increases, there is no economic benefit to continue pure steam injection. At this stage, a wind-down process can be started to utilize energy in place and continue oil production. One or more noncondensable gases (NCG), such methane, nitrogen, carbon dioxide and flue gas or a mixture thereof, is injected into the reservoir with or without steam. One study showed that the hot chamber continued its expansion after steam injection was stopped and a gas injection was initiated. The continuous expanding period represented the most productive period in the gas injection wind-down process, and a total of 12.5% of OOIP was recovered during wind-down. Another numerical simulation and economic evaluation showed that a co-injection of steam and non-condensable gas gave the best result.

Our hypothesis is that either after, during, or in place of, wind-down, we could instead use the heat in the reservoir to generate geothermal power, by injecting water or other heat transfer fluid into the reservoir, and collecting it once sufficiently heated and capturing that heat energy in any known or to-be-developed geothermal energy production method. The electricity can be used onsite for continued reservoir production, routed to other locations for use, or even stored, as needed. If needed, the hot fluid may be sent to a separator to collect any entrained oil, but there is not expected to be much, if any, production after wind-down.

If sent to the separator, the separated produced water may be recycled by injection back into the reservoir to continue the geothermal harvesting once used to generate electricity. If so, the method will benefit from insulating the piping so as to minimize heat loss. Thus, pipes and tanks may be insulated, and vacuum insulating tubing may be used downhole, especially in colder climes. However, our modelling indicates that such efforts may not be needed, even in a model of Canadian oil sand reservoir. Nonetheless, where cost effective, efforts to minimize heat loss are expected to further improve the economics of geothermal energy production.

Modelling

The first step in using the geothermal energy of SAGD or any other steam-assisted oil recovery operation was to build a simulation model of a typical Canadian oil sand reservoir. This was done to model various well configurations in order to maximize the geothermal energy production and monitor their economics.

A 2D sector model with 9-injector-producer well-pairs was designed in order to evaluate the well arrangements for producing geothermal power. The model was based on McMurray formation, each well-pair averaging around 925 m in lateral length and 400 m vertical depth below the surface. Each of the 9 well-pairs in the model were spaced on an average of 140 meters apart with a 4 meter vertical spacing between wells in the pair. SAGD simulations were carried out on the wells to mimic 13-year-long extraction history based on field models and simulations.

Once the SAGD simulations were complete, geothermal energy capture was modelled. In our first round of testing, we tried three different strategies for the production of geothermal power.

In the first strategy, the injector of well-pair 1 is used to inject water, and the heated steam is pumped out of production well of the adjacent well-pair 2's producer, keeping all other wells of the 9-well system closed.

In the second strategy, water is injected via injector of well-pair 1 and heated water/steam produced from the producer of well-pair 9 located to the far-end of the array.

A third strategy was tested whereby water is injected into the injector of every other well-pair (1, 3, 5, etc.) and heated water/steam is produced from the producers of well-pairs therebetween (2, 4, 6, etc.).

In all these scenarios, all remaining wells not used for injection or production were kept shut.

At the end of life of SAGD operations, much of the bitumen and condensed water from the pore space is removed, leaving behind mostly a steam filled pore space. The expansion capability of steam in the pores creates high pressure during SAGD, having increased from virgin reservoir pressures of about 1,200 kPa to greater than 3,000 kPa.

Studies showed that the relatively colder injected water during the harvesting operation causes an initial period of decreasing average reservoir pressures to be seen, even with the injection of an incompressible fluid. This phenomenon is attributed to the sudden cooling of the pore space, by which the temperature front travels faster than the pressure front, resulting in condensing steam in the pores, thus affecting the overall reservoir pressure. Due to this, the producers are unable to produce fluids at the sufficient rates for a period, owing to poor pressure drives.

To minimize this downtime, water injection was simulated at maximum possible rates. Thus, injectors were constrained to inject water at 2,590 meter$^3$/day (16,000 bbl/day), with producers constrained to produce at bottomhole pressures of 2,740 kPa (400 psi). The intention was to maintain bottomhole pressures, thus minimizing downtime and leave the reservoir at its end-of-SAGD pressure after the heat harvesting process. Using warmer fluids is also expected to help minimize this problem.

The strategies tested and the results obtained are discussed in more detail below. Further optimization will lead to additional strategy developments.

Strategy 1

Figure 2:
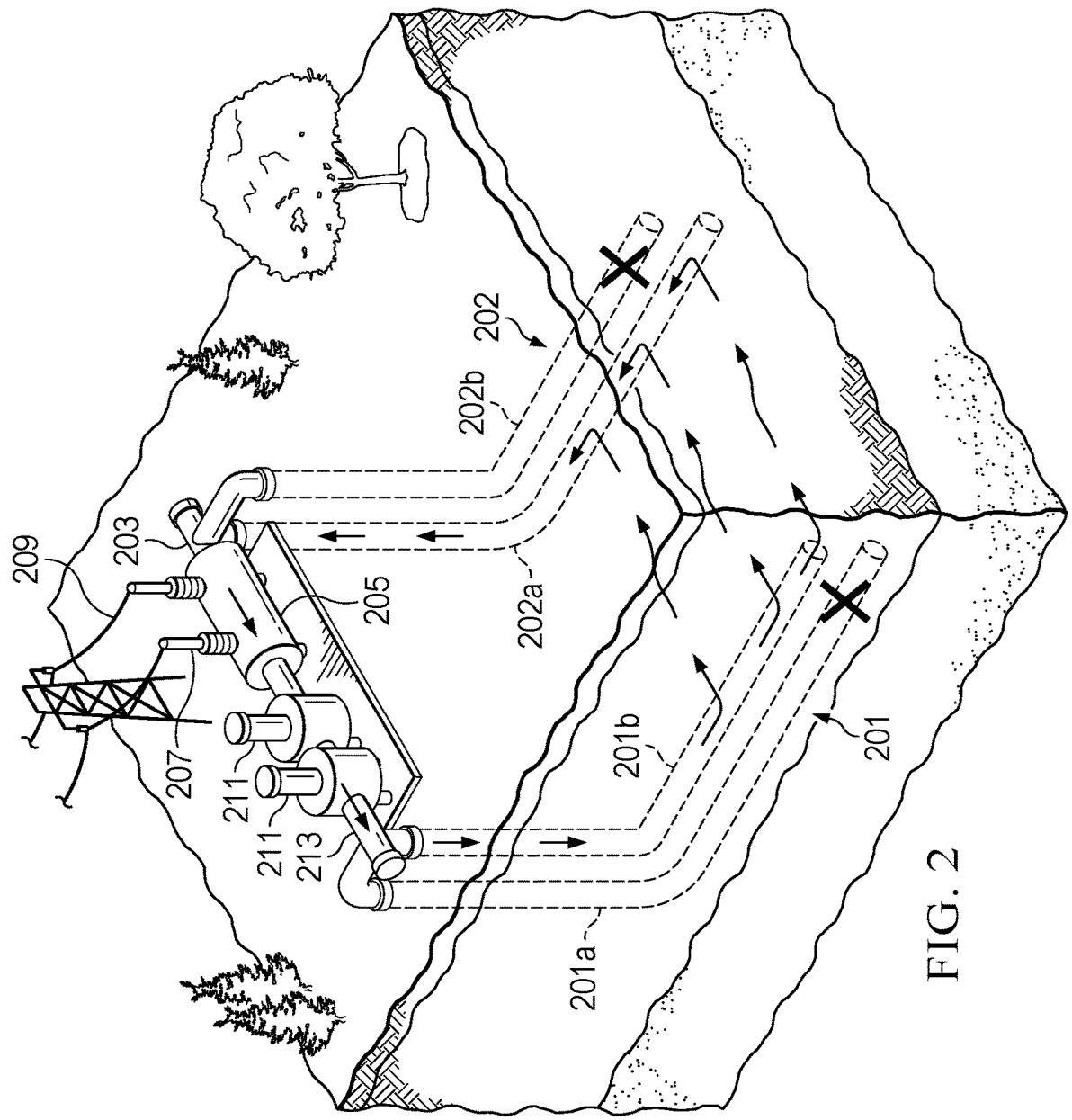
FIG. 2. Adjacent well SAGD geothermal power extraction.

Strategy 1 involved injecting from well-pair 1's injector and producing from the adjacently located well-pair 2's producer, keeping all other wells shut, as shown in FIG. 2. FIG. 2 shows two well-pairs 201 and 202, and the seven unused well-pairs of the model are omitted for simplicity.

Injector well 201b is fitted for injection, while producer 201a is closed (see X). The adjacent well-pair 202 has a closed injector well 202b and producer well 202a is fitted for production. Cooler water from water storage 211 enters injector 201b via line 213 and enters the reservoir. This water is heated by the reservoir, and pushed towards the producer 202a by continued injection of water. The hot water and/or steam enters producer 202a and is produced via line 203 to the turbine and generator 205, which captures the heat and converts it to electricity 207, which can be used onsite or distributed via power lines 209.

In our simulation of the first strategy, we found that using adjacent well-pairs resulted in a 2.5-year downtime with very low rates of production, after which the reservoir pressures increased resulting in sufficient pressure drives and water production rates. However, the closer distance between the injector and producer resulted in a poor capture of energy from the reservoir, owing to circulating water between the well-pairs. This scheme rendered an overall 5% recovery of the initial energy put in place (IEPIP), at the end of a 11-year harvest period.

Strategy 2

Figure 3:
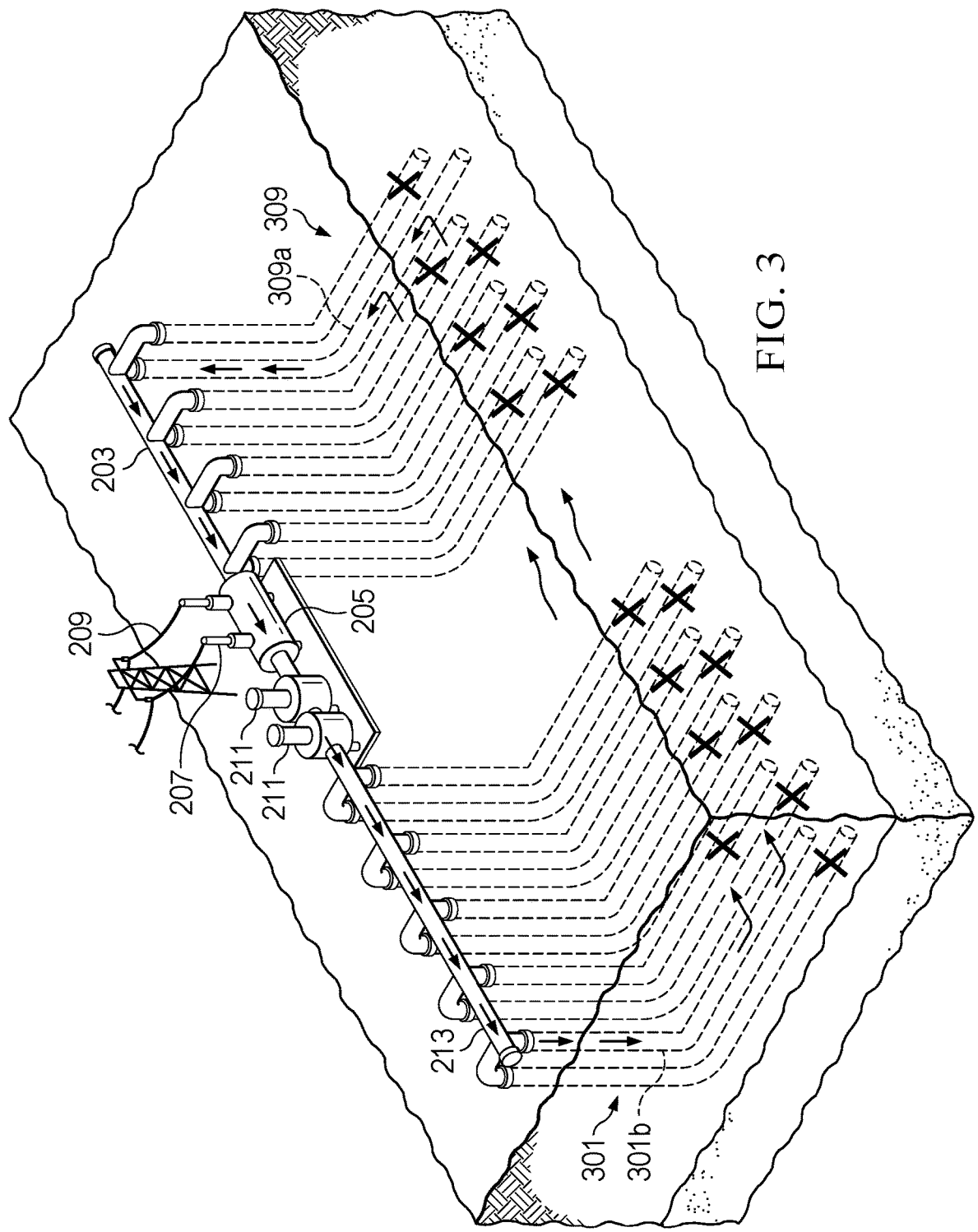
FIG. 3. Multi-well spacing for SAGD geothermal power extraction.

Strategy 2 had injection from well-pair 1's injector to the far-end located well-pair 9's producer. Thus, there was a significant lateral interval of reservoir for the water to traverse (8×140=1120 meters). FIG. 3 shows this strategy, wherein there are 9 well-pairs, though only the first well-pair 301 and last well-pair 309 are labelled. Injector 301b is fitted for injection, producer 309a is fitted for production, and all remaining wells are closed (X). The remaining elements are the same as in FIG. 2 and the labelling is omitted for clarity.

Strategy 2 showed a similar downtime in production to strategy 1, given that the incompressible volume injected was the same, thus allowing the reservoir pressure response to be similar. However, mostly there was significant overall improvement, with the larger reservoir traversal resulted in an 18% recovery of the IEPIP over 11 years.

Strategy 3

Figure 4:
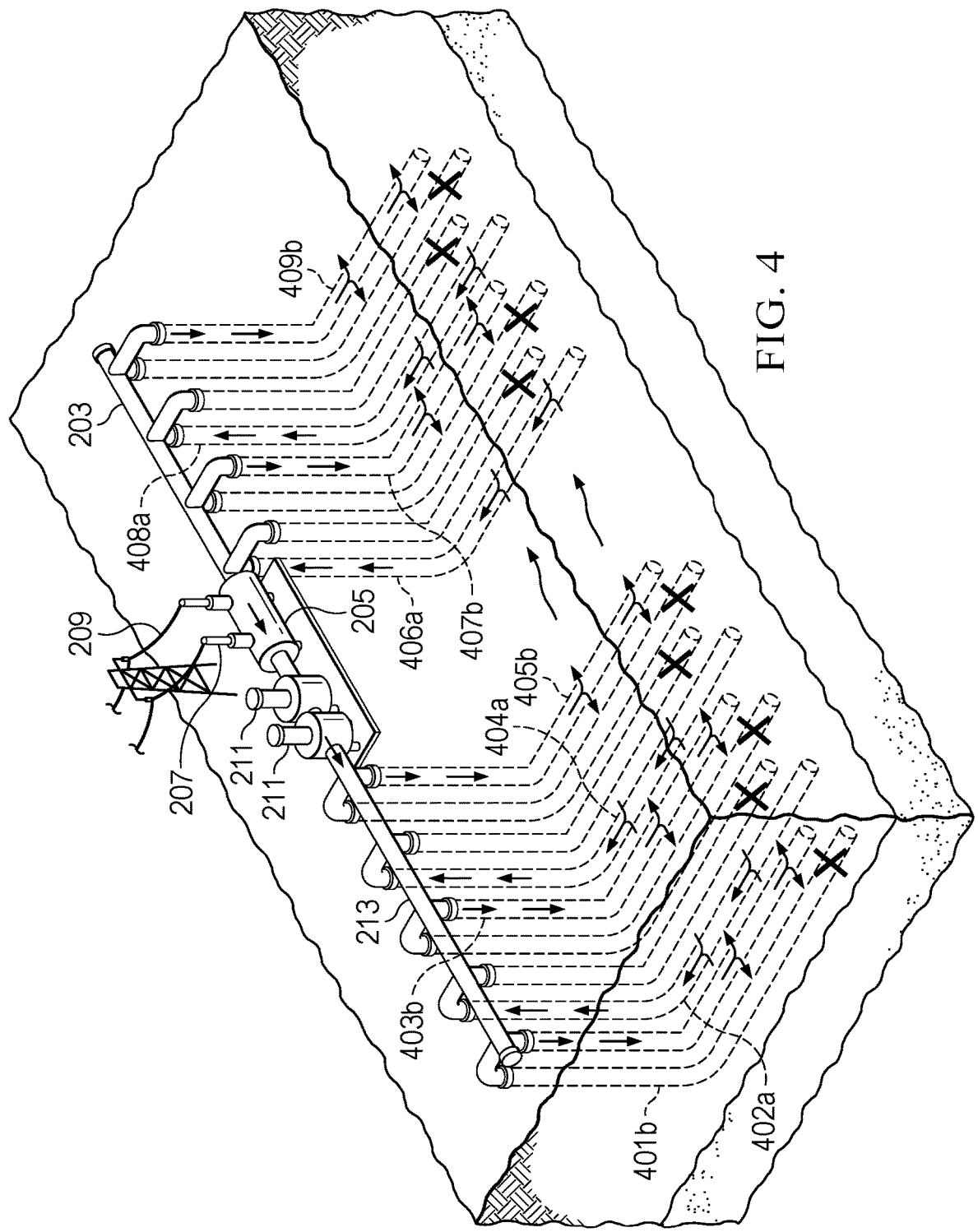
FIG. 4. Array of alternate well spacings for SAGD geothermal power extraction.

In strategy 3, we arranged injectors and producers to be in adjacent alternating well-pairs as shown in FIG. 4. Thus, the injectors were 401b, 403b, 405b, 407b and 409b. The producers were 402a, 404a, 406a, and 408a.

Strategy 3 yielded the best-case scenario, with a lesser downtime of only 3 months owing to much larger incompressible volumes being injected into more wells, and a 57% recovery of IEPIP in 11 years. On a fairer comparison note, based on the net energy recovered per barrel of water injected into the reservoir, strategy 3 still outshines the others for the 9 years of harvest, after which strategy 2 takes the lead. Strategy 1 continued to be a poor performer over the entire span. On a time-wise note, strategy 3 is recommended, provided the large water management of 64,000 bbl/day/pad can be handled.

Heat Loss

Having proven that the thermal energy can be efficiently swept from the reservoir to the production wellbores, heat-losses were investigated in the vertical sections of the wells to quantify the final heat brought to the surface. The well completions were studied in-depth to understand potential heat loss via conduction across the wellbore walls and cement configurations. It was found that over the 11 years of harvest, only 1.2% of the cumulative energy available downhole was lost to the surroundings. Thus heat-losses in the vertical sections are insignificant. However, it may be possible to use vacuum insulated or other insulated tubing for production in regions where heat loss is expected to be a problem. Indeed, some wells and other equipment in various Northern climes may already be insulated to minimize heat loss for various EOR methods.

Considering all potential heat losses, energy investments into the reservoirs, and pump energy requirements for handling the operations, the net energy production rate from strategy 3 was shown to range from an average of 3E+12 Joules/day for the first 6 years and decrease to 7E+11 Joules/day at the end of 11 years. The yearly-average energy consumption rate per house in Alberta is 7E+07 Joules/day. Thus, if the surface power-plant facility's efficiency is sufficient to capture a good portion of the produced energy from the heat harvest, this can result in enormous benefits.

Figure 5:
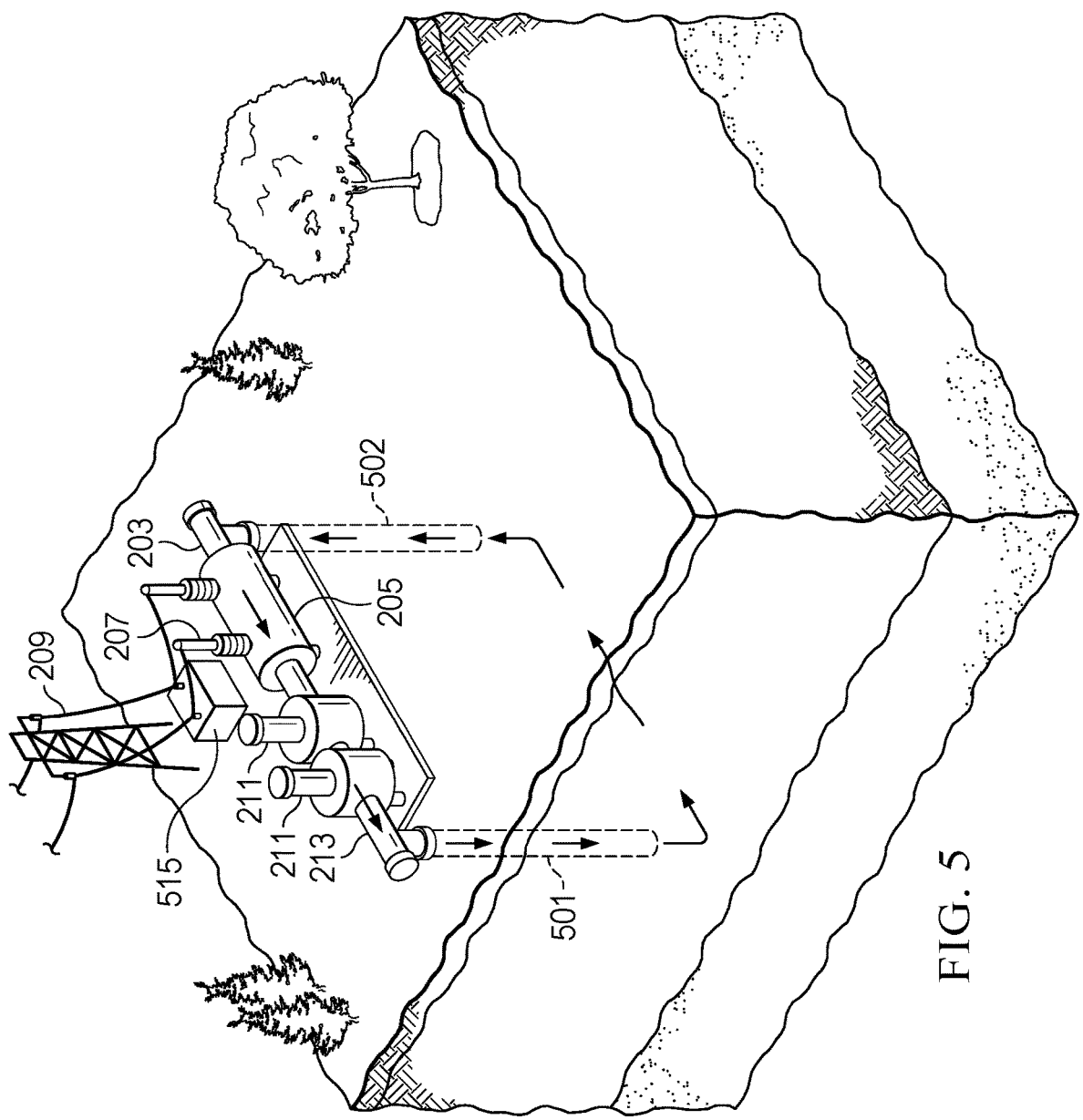
FIG. 5. Vertical wells being used for geothermal energy production.

Based on minimal heat losses in the vertical portion of the well, we surmise that it will also be possible to collect heat energy using vertical wells as shown in FIG. 5. In FIG. 5 we see injector 501 and producer 502 being some 50-2000 meters apart, herein shown 140 meters apart for direct comparison with strategy 3. Also seen is a battery or other storage unit 515. Although only two wells are shown, we expect that array of wells like this will provide similar improvements as seen with strategy 3 compared to strategy 1.

Optimization Studies

In addition, to the initial three strategies tested above, we also tested a variety of parameters in further modelling studies, including producer bottom hole pressure (BHP), injection temperature, production rate, and injection rate. The pattern simulated is the use of every other end of life injector well used for injection, and the intervening injectors closed, and every producer well fitted for production, resulting in 4 injectors over 9 producers (Strategy 4). The results are shown in Table 1, the optimal results underlined.

TABLE 1

Optimization studies-Strategy 4

| Sensitivities | Value | Cumulative Enthalpy (J) After 5 years | Cumulative Enthalpy (J) After 10 years | Joules/bbl at 10 years | MAX Powerable EM Wells | Maintained Powerable EM Wells |
|---|---|---|---|---|---|---|
| Producer BHP | 2740 kPa | 7.21E+13 | 1.57E+14 | 2.12E+7 | 6 | 5 |
| | 1200 kPa | 1.18E+14 | 1.85E+14 | 2.40E+7 | 52 | 4 |
| Injection Temp | 68° C. min | 7.34E+13 | 9.93E+13 | 1.27E+7 | 67 | 1 |
| | 68° C. to 16° C. min | 1.2E+14 | 1.91E+14 | 2.45E+7 | 67 | 3 |
| | 16° C. min without gradual change | 1.41E+14 | 2.06E+14 | 2.65E+7 | 67 | 5 |
| Production Rate | 1500 m$^3$/day | 1.24E+14 | 2.04E+14 | 1.18E+8 | 89 | 4 |
| | 1000 m$^3$/day | 1.18E+14 | 1.85E+14 | 1.08E+8 | 52 | 4 |
| | 500 m$^3$/day | 3.96E+13 | 1.00E+14 | 5.83E+7 | 8 | 2 |
| | 100 m$^3$/day | −2.50E+13 | −8.97E+12 | −5.21E+6 | 6 | 0 |
| Injection Rate* | 2590 m$^3$/day | 1.28E+14 | 2.08E+14 | 2.65E+7 | 89 | 4 |
| | 2000 m$^3$/day | 1.30E+14 | 2.10E+14 | 3.46E+7 | 87 | 3 |
| | 1500 m$^3$/day | 1.34E+14 | 2.14E+14 | 2.76E+7 | 88 | 2 |
| | 1000 m$^3$/day | 1.32E+14 | 2.12E+14 | 2.72E+7 | 88 | 1 |

In general, we found that a decrease in producer BHP increases the energy gained per bbl of water injected. However, since a minimum BHP is needed for the producer to continue transporting the produced fluid to the surface, the realistic minimum BHP for the producer while optimizing the simulations is 1200 kPa.

In addition, faster injection of cold water into the reservoir—without causing thermal shock to the equipment—results in an increase in heat harvested. Maximizing the water production with the pressure available to lift the fluid up leads to an increase in energy gain per bbl of water.

We also tested varying the height of the injectors by simulating higher injectors and found that new injectors are not needed (data not shown). The typical 4 meter separation between injectors and producers will suffice.

Figure 6:
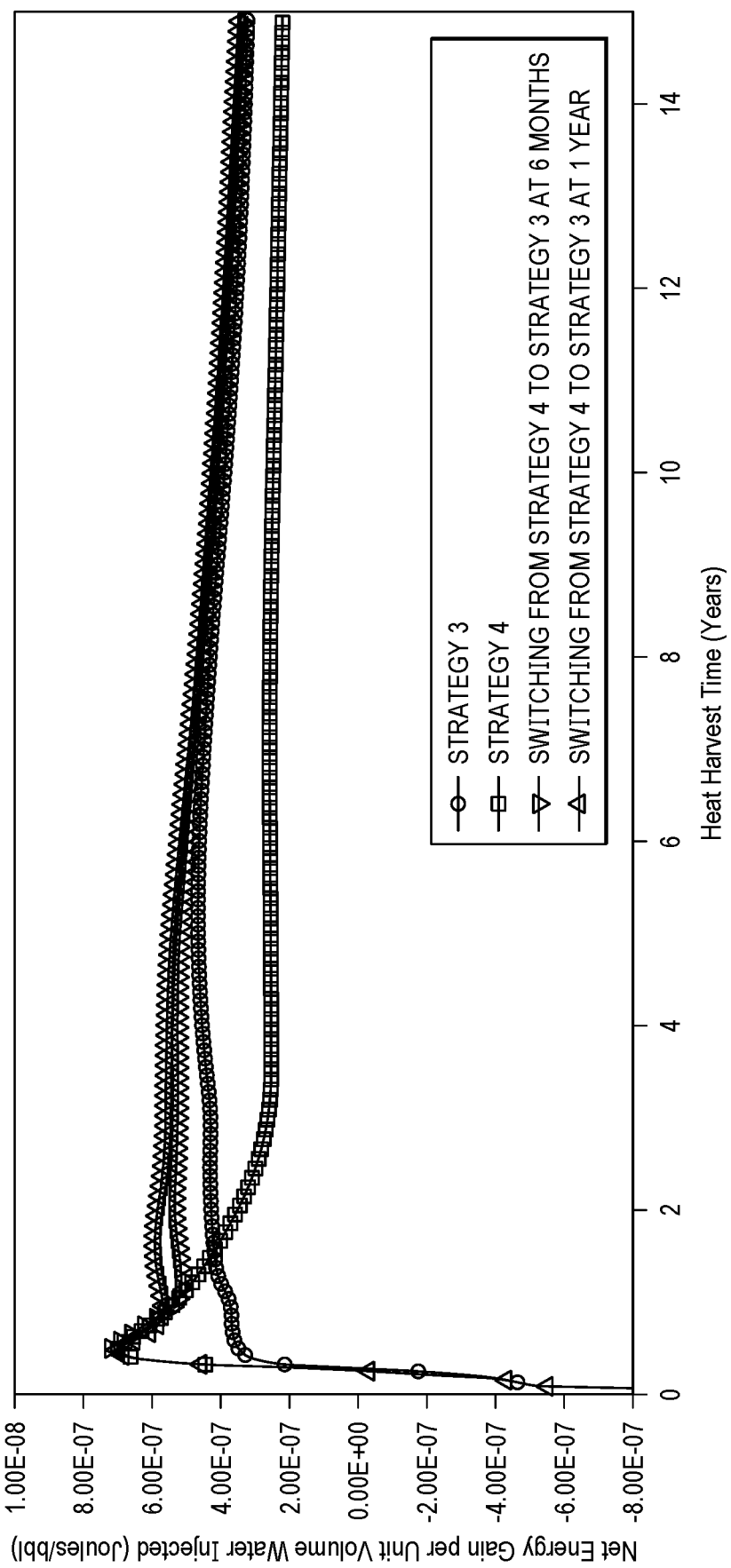
FIG. 6 Energy gained over time using strategy 3 or 4 or using strategy 4 then 3.

We also tested using every other injector and every producer, but switching to every other producer at 6 months or a year, essentially switching from Strategy 4 to Strategy 3. The results are shown in FIG. 6, indicate that switching to Strategy 3 at 1 year further improves the overall energy being produced.

In future modelling studies, we would also like to quantify the optimal lateral spacing between wells under various geological conditions. Based on the comparison between strategies 1 and 2, we predict that a larger spacing will be more effective, up to a point. These modelling studies will allow us to determine optimal spacing and well arrangements in a variety of reservoir types, and then apply the optimized plan in the field to recover energy. Thus, we plan to rerun one or more of the above strategies with all parameters being the same, and only varying the lateral distance between injectors and producers (150 m, 300 m, 450 m, 600 m, 750 m, and 1000 m). We predict that the optimal distance will vary with reservoir geological characteristics, but be in the 50-2000 m or 100-1000 m or 150-500 m ranges). Given the data in FIG. 6, we suspect that increasing spacing with time may prove to be the most optimal method.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description and abstract are not to be used to limit the scope of the invention. The invention is specifically intended to be as broad as the claims below and their equivalents.

The following references are incorporated by reference in their entireties for all purposes.

U.S. Pat. No. 3,786,858 Method of extracting heat from dry geothermal reservoirs.

U.S. Pat. No. 3,827,243 Method for recovering geothermal energy.

US20130300127 Geothermal energy recovery from abandoned oil wells.

US20210025265 Enhanced carbon dioxide-based geothermal energy generation systems and methods.

The future of geothermal energy: Impact of Enhanced geothermal systems (EGS) on the United States in the 21$^{st}$ century. MIT Report, 2006.

The invention claimed is:

1. A method of producing geothermal energy from an oil reservoir, said method comprising:
   a) producing oil from a plurality of horizontal well-pairs in a reservoir at a first pressure using added heat until oil recovery cost exceeds value, each well-pair comprising an upper well parallel to and over a lower well;
   b) selecting upper wells in alternate well-pairs to be injection wells fitted for injection and closing upper wells therebetween;
   c) selecting one or more lower wells adjacent said injection wells to be production wells fitted for production, and closing unselected lower wells, such that an injection well is laterally separated from a nearest production well by a distance D;
   d) injecting fluid into said injection wells at a rate to maintain said first pressure and producing heated fluid from said production wells; and
   e) sending said heated fluid to an energy recovery system to convert geothermal energy in said heated fluid into electricity.

2. The method of claim 1, wherein said fluid is water and said heated fluid is water, steam, or water and steam.

3. The method of claim 1, wherein said distance D is from 50 to 2000 meters.

4. The method of claim 1, wherein said distance D increases with time by closing additional wells.

5. The method of claim 1, where said method is preceded by a first period of time wherein fluid is injected into a plurality of injector wells in alternate well-pairs and producing heated fluid from all producer wells in all well-pairs.

6. The method of claim 1, wherein said electricity is electrically connected to a subsurface heat generating system and used to generate electric heat for additional wells in said reservoir.

7. A method of producing geothermal energy from an oil reservoir, said method comprising:
   a) producing oil from a plurality of horizontal well-pairs in a reservoir at a first pressure using added heat until oil recovery costs exceed value, each well-pair comprising an injection well parallel to and over a production well;
   b) closing alternate injection wells and injecting fluid into open injection wells at a rate to maintain said first pressure;
   c) producing heated fluid from all production wells for a first period of time;
   d) closing alternate production wells such that each closed injection well is paired with an open production well and producing heated fluid from said open production wells for a second period of time;
   e) sending said heated fluid to an energy recovery system to convert geothermal energy in said heated fluid into electricity; and
   f) storing said electricity or using said electricity to produce more oil.

8. The method of claim 7, wherein said first period of time is about a year.

9. He method of claim 7, wherein said second period of time is at least 10 years.

* * * * *

UNITED STATES PATENT AND TRADEMARK OFFICE
CERTIFICATE OF CORRECTION

PATENT NO. : 12,066,012 B2
APPLICATION NO. : 18/452722
DATED : August 20, 2024
INVENTOR(S) : Mohammad H. Kalaei et al.

It is certified that error appears in the above-identified patent and that said Letters Patent is hereby corrected as shown below:

In the Claims

On Column 14, Line 28, of Claim 9:
"He method of claim 7, wherein said second period of"
Should read as:
---The method of claim 7, wherein said second period of---

Signed and Sealed this
Seventeenth Day of September, 2024

Katherine Kelly Vidal
*Director of the United States Patent and Trademark Office*